Aug. 3, 1965 R. L. VAN ANTWERP 3,198,528
VIBRATION DAMPENING MOTOR MOUNTING FOR PHONOGRAPHS
Filed Feb. 11, 1963 3 Sheets-Sheet 1

INVENTOR.
Robert L. Van Antwerp
BY
ATTORNEY.

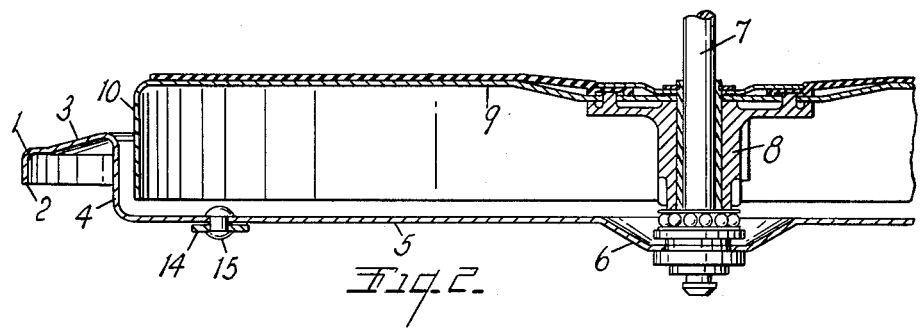
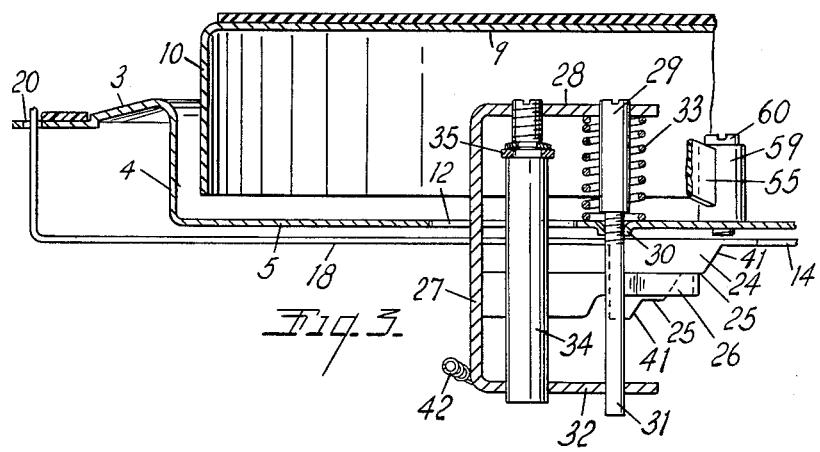
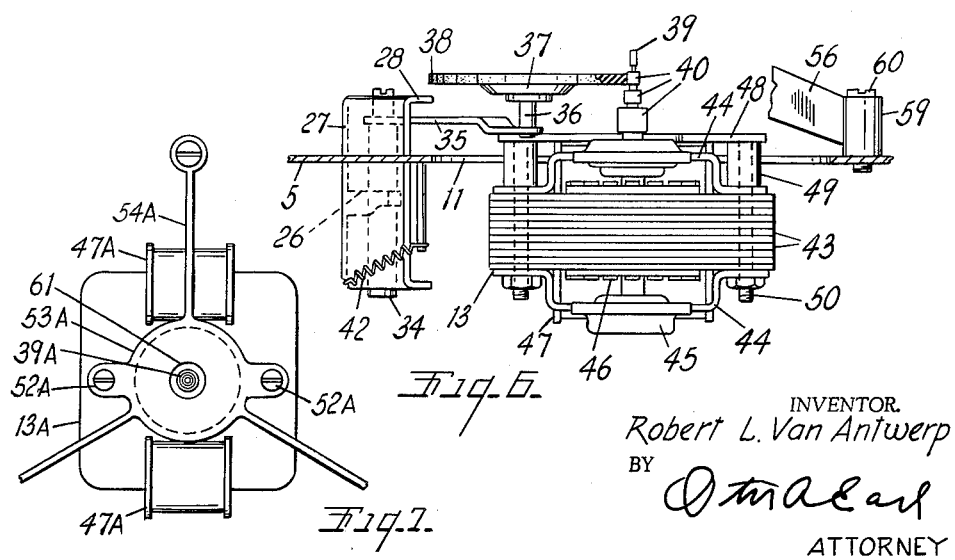

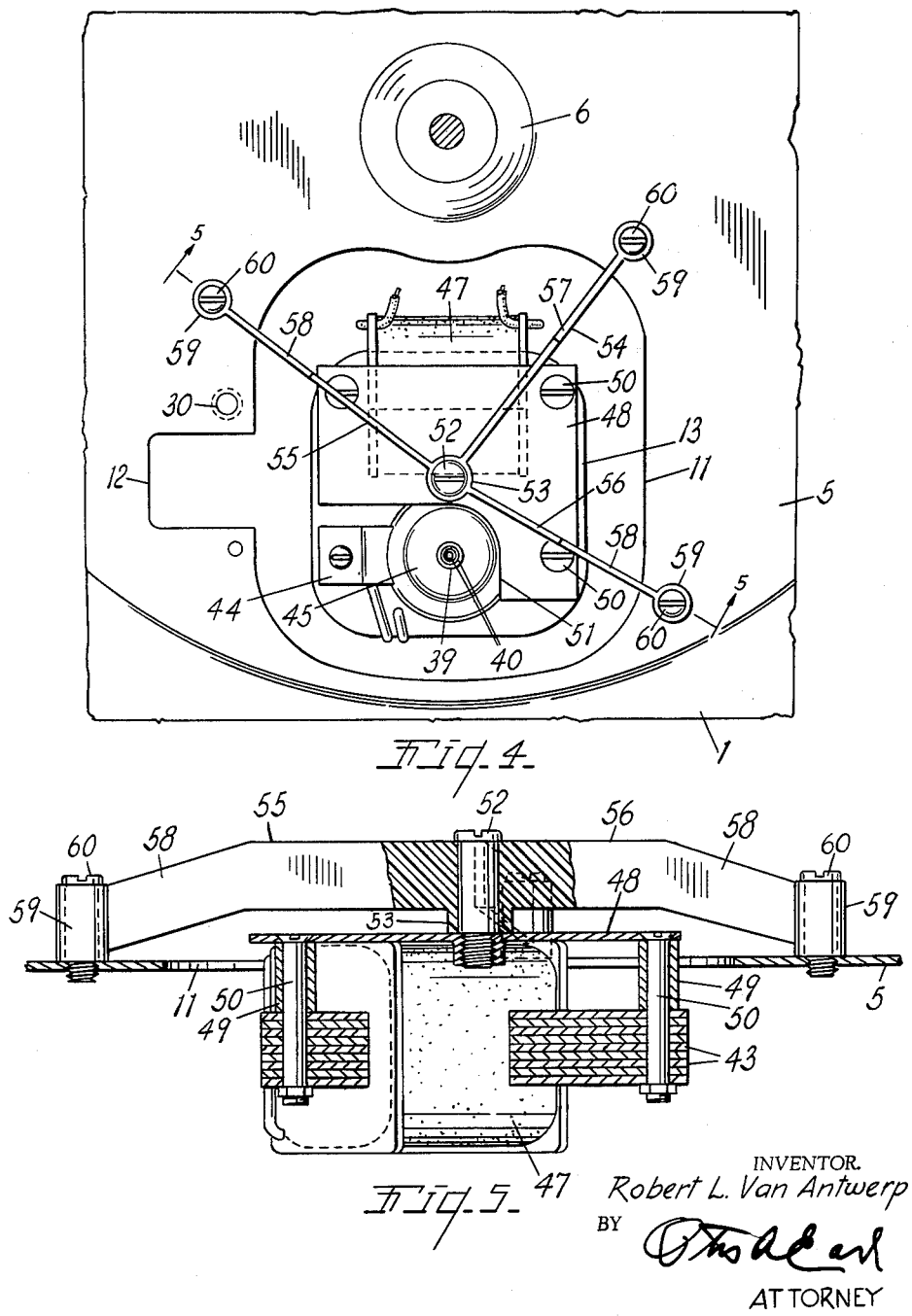

United States Patent Office 3,198,528
Patented Aug. 3, 1965

3,198,528
VIBRATION DAMPENING MOTOR MOUNTING
FOR PHONOGRAPHS
Robert L. Van Antwerp, Stevensville, Mich., assignor to
Maestro Corporation, Stevensville, Mich.
Filed Feb. 11, 1963, Ser. No. 257,494
11 Claims. (Cl. 274—39)

This invention relates to improvements in motor mounting for phonographs. The principal objects of this invention are:

First, to provide a motor mounting for an adjustable speed rim drive turntable that will reduce transient and undesired speed variations and fluctuations of the turntable.

Second, to provide a motor mounting that will cushion and absorb torsional vibrations of the motor due to current fluctuations and variations in motor torque due to inherent characteristics built into the motor such as unbalance of the motor rotor, pulsations due to polarity change in the motor windings or unbalance of the magnetic characteristics of the rotor and stator.

Third, to provide a mount for the motor of a phonograph that supports the motor at a single point corresponding or closely adjacent to a line through the null point or axis of torsional vibration of the mass of the motor and parallel to the axis of rotation of the motor.

Fourth, to provide a motor mount having the foregoing vibration dampening characteristics that locates the motor and drive shaft close underneath the turntable thus permitting the use of a relatively short shaft and further reducing speed fluctuations due to inaccuracies in the shaft and shaft mounting.

Fifth, to provide a motor mounting having the foregoing properties that is inexpensive and durable and which does not lose its cushioning properties due to age or deterioration of the mounting.

Other objects of the invention will be apparent from a consideration of the following description and claims. The drawings, of which there are three sheets, illustrate a highly practical form of the motor mounting.

FIG. 2 is a fragmentary vertical cross sectional view taken along the plane of the line 2—2 in FIG. 1.

FIG. 3 is a fragmentary vertical cross sectional view through a portion of the speed adjustment or selector mechanism taken along the plane of the line 3—3 in FIG. 1.

FIG. 4 is an enlarged fragmentary plan view of the motor mount with the turntable removed and the speed selecting mechanism omitted.

FIG. 5 is a fragmentary vertical cross sectional view taken along the plane of the line 5—5 in FIG. 4.

FIG. 6 is a fragmentary front elevational view of the motor and the idler roller.

FIG. 7 is a fragmentary top plan view of a modified form of motor and motor mounting with the turntable and idler roll removed.

Figure 1:
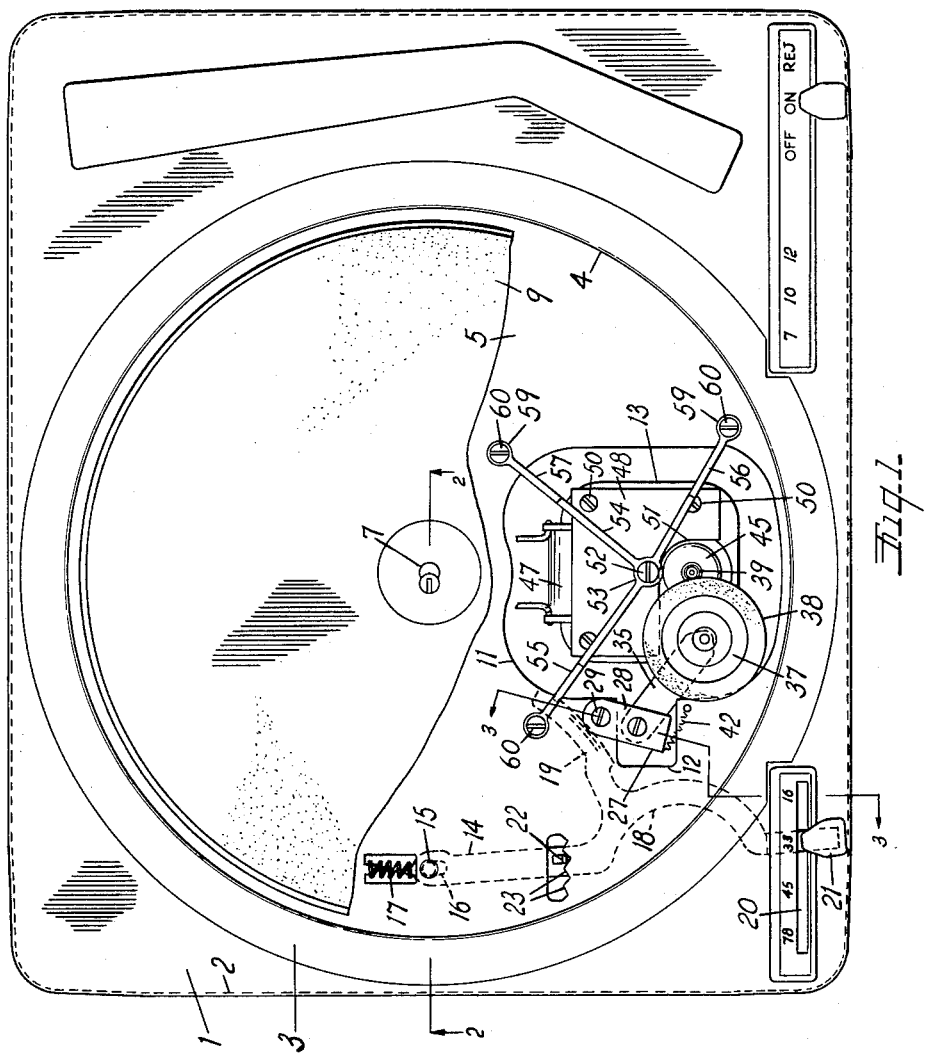
FIG. 1 is a top plan view of a phonograph turntable and base plate with parts broken away to illustrate the motor mount and the drive speed adjustment.

As appears most clearly from FIGS. 1 and 2, the example of the phonograph illustrated is built up on a rectangular base plate 1 having a downturned peripheral flange 2 and a top that inclines upwardly at 3 around a circular depressed cylindrical wall 4. The center of the plate within the wall 4 is generally flat as at 5 except for a conical depressed center 6 supporting the fixed upright record spindle 7 and bearing 8 for the circular turntable 9. The turntable has a downturned peripheral drive flange 10 that nests rotatably within the cylindrical depression 4. Other slots, ears and anchors and openings to be described are formed in the flat central portion 5.

A generally rectangular hole 11 with a notch or opening 12 in one side thereof is formed in the front of the circular central portion 5 to receive the motor 13 and the speed adjusting mechanism. A flat speed selector lever 14 is supported by a pivot 15 on the underside central portion 5. The lever has a slot 16 passing the pivot and is biased forwardly by a spring 17. An arcuate offset 18 clears other mechanism (not shown) and a laterally extending arm 19 acts to set the speed of the turntable as will be described. The forward end of the lever turns up through a slot 20 as an operating finger piece 21. In swinging about the pivot 15, the lever 14 moves an upturned ear 22 over arcuately arranged toothed slot 23 in the base 5 to select the speed desired with the spring 17 yielding to permit passage over the teeth.

The lateral arm 19 has a downturned flange 24 with steps 25 that coact with and depress the arm 26 on a yoke 27. The yoke has an upper arm 28 pivoted on a pin 29 threaded into the central portion 5 of the base at 30. A lower extension 31 on the pin locates and guides the lower arm 32 of the yoke. The yoke swings slightly in the notch 12 in the base and is biased upwardly by a spring 33. An upright pin 34 threaded into the upper yoke arm 28 and retained at its lower end in the lower arm 32 carries a laterally projecting idler roll support arm 35. The end of the support arm carries an upstanding idler roll stub shaft 36 on which the idler drive roll 37 is rotatably mounted. The roll has a rubber tire 38 that is driven by a selected portion of the motor shaft and in turn rolls against and drives the depending cylindrical drive flange 10 of the turntable. As appears most clearly in FIGS. 4 and 6 the motor shaft 39 has stepped diameters 40 on its upper end that determine the different speeds of the turntable. As the cammed or inclined edges 41 between the steps 25 strike the arm 26 they swing the yoke slightly clockwise away from the motor so that the idler roll clears the steps 40 in the shaft in descending to a larger section of the shaft. A spring 42 urges the yoke and the idler support arm and roll back into driving engagement with both the drive shaft and the turntable flange.

The motor and mounting which coact with the foregoing shiftable drive train appear most clearly in FIGS. 1, 4, 5 and 6. The particular motor illustrated has a box shaped rectangular stator core of laminated metal plates 43. Yokes 44 on the top and bottom of the stator support bearings 45 for the shaft and rotor 46 with the previously described steps 40 projecting a short distance above the upper bearing. A coil 47 loops around one side of the stator. Nothing new is claimed for the motor except the short shaft which results from the mounting.

A flat metal mounting plate 48 is spaced above the stator and coil by three sleeves 49 secured to the corners of the stator by screws 50. One corner of the plate is notched out as at 51 to clear the upper bearing and shaft and the plate is supported at a single central point by a screw 52 passed through the center boss 53 of a three armed spider 54. The boss and spider are located laterally, between the coil and the upper bearing with the boss 53 at what is determined to be the vertical axis of torsional vibration or null point of the motor. This closely approximates a vertical line through the center of mass of the motor.

The spider 54 is of molded plastic material that is relatively stiff but which has inherent flexibility in its arms which can be flexed with the fingers. Two arms 55 and 56 are generally opposed but not exactly aligned and a third arm 57 projects at an unequal angle within the obtuse angle formed by the first two arms. All arms are transversely narrow or thin and vertically thicker plates or ribs and are molded integrally with the central boss 53. The arms extend horizontally across the motor and then angle downwardly as at 58 to integral mounting bosses 59 secured to the top of the base 5 by screws 60 at three corners of the opening 11 in the base plate.

The vertically thickened dimension of the arms 55, 56 and 57 provide substantial vertical rigidity to the position of the motor and motor shaft close up underneath the turntable 10. At the same time the lateral or angular flexibility of the thin arms yieldably resists and absorbs torsional vibrations of the motor. Being at the center of torsional vibrations these angular motions are kept to a minimum. The shaft 40 being held yieldably in contact with the idler roll by the spring 42 continues to impart substantially uniform rotation to the turntable for more perfect reproduction of the sound from the record on the turntable. The spider thus constitutes a relatively rigid motor support that is connected to the mounting plate around the motor but which is angularly flexible in its central area relative to the connections to the mounting plate. The relatively flexible central area is connected to the motor closely adjacent the null point of angular oscillation of the motor. In the particular motor illustrated, this null point or axis of angular oscillation is off-set from the motor shaft due to the use of the single coil which offsets the center of mass. However, the same desirable effect of cushioning and dampening angular oscillations of the motor would be obtained with a motor having its center of mass and axis of oscillation closer to or even concentric with its shaft by similarly connecting the central area of the support adjacent the shaft. As appears in the modification in FIG. 7 the central boss 53A of the modified spider 54A is enlarged to provide space for a hole 61 passing the shaft 39A of a modified motor. In this case, plural screws 52A secure the central area of the support to the motor.

The motor mounting is relatively inexpensive and is sturdy and uniform in its vibration dampening characteristics as there are no highly deformable cushions to loose their resiliency with time and under continued weight of the motor.

What is claimed as new is:

1. In a phonograph having a motor with a drive shaft and an idler roll yieldably and adjustably urged against said shaft,
    a base plate supporting a turntable in embracing relation over said shaft and said idler roll,
    means supporting said idler roll mounted on said base plate,
    an opening formed in said base plate,
    said motor including a laminated stator and a rotor supporting said shaft through said opening,
    a mounting plate secured in spaced relation above said stator at three corners of the stator,
    a mounting screw engaged with said mounting plate at a point along a vertical line through the center of mass of said motor and mounting plate and off-set from said shaft,
    a spider of molded plastic material having a central boss secured to said mounting plate by said screw,
    three integral arms projecting from said boss with two arms generally opposed at a wide obtuse angle and a third arm projecting at an unequal angle within said obtuse angle,
    said arms being laterally narrow and relatively flexible and vertically thickened and relatively inflexible under the weight of said motor,
    downwardly inclined ends on said arms terminating in integral supporting bosses,
    and screws securing said supporting bosses to said base plate around said opening in said base plate.

2. In a phonograph having a motor with a drive shaft and an idler roll yieldably and adjustably urged against said shaft,
    a base plate supporting a turntable in embracing relation over said shaft and said idler roll,
    means supporting said idler roll mounted on said base plate,
    an opening formed in said base plate,
    said motor including a stator and a rotor supporting said shaft through said opening,
    a mounting plate secured in spaced relation above said stator at three corners of the stator,
    a mounting stud engaged with said mounting plate at a point along a vertical line through the center of mass of said motor and mounting plate and off-set from said shaft,
    a spider of molded plastic material having a central boss secured to said mounting plate by said stud,
    three integral arms projecting from said boss with two arms generally opposed and a third arm projecting at an angle between said first two arms,
    said arms being laterally narrow and relatively flexible and vertically thickened and relatively inflexible under the weight of said motor,
    downwardly inclined ends on said arms terminating in integral supporting bosses,
    and means securing said supporting bosses to said base plate around said opening in said base plate.

3. In a phonograph having a motor with a drive shaft and an idler roll yieldably urged against said shaft,
    a base plate supporting a turntable in embracing relation over said shaft and said idler roll,
    means supporting said idler roll mounted on said base plate,
    an opening formed in said base plate,
    said motor including a stator and a rotor supporting said shaft through said opening,
    a mounting plate secured to said stator,
    a mounting element engaged with said mounting plate near a joint along a line through the center of mass of said motor and mounting plate and off-set from and parallel to said shaft,
    a spider of molded plastic material having a central boss secured to said mounting plate by said element,
    plural arms projecting from said boss with two arms generally opposed,
    said arms being laterally narrow and relatively flexible and vertically thickened and relatively inflexible under the weight of said motor,
    inclined ends on said arms terminating in integral supporting bosses,
    and means securing said supporting bosses to said base plate around said opening in said base plate.

4. In a phonograph having a motor with a drive shaft and an idler roll yieldably urged against said shaft,
    a base plate supporting a turntable in embracing relation over said shaft and said idler roll,
    means supporting said idler roll mounted on said base plate,
    an opening formed in said base plate,
    said motor including a laminated stator and a rotor supporting said shaft through said opening,
    a mounting plate secured to said stator,
    a mounting element engaged with said mounting plate near a point along a line through the center of mass of said motor and mounting plate and off-set from and parallel to said shaft,
    a spider of molded plastic material having a central boss secured to said mounting plate by said element,
    plural integral arms projecting from said boss with two arms generally opposed and a third arm projecting at an angle between said first two arms,
    said arms being laterally narrow and relatively flexible and vertically thickened and relatively inflexible under the weight of said motor,
    ends of said arms terminating in integral supporting bosses,
    and means securing said supporting bosses to said base plate around said opening in said base plate.

5. In a phonograph having a motor with a drive shaft and an idler roll yieldably urged against said shaft, a base plate supporting a turntable in embracing relation over said shaft and said idler roll,
means supporting said idler roll mounted on said base plate,
an opening formed in said base plate,
said motor including a rotor supporting said shaft through said opening,
a mounting plate secured to said motor,
a mounting element engaged with said mounting plate near a point along a line through the center of mass of said motor and mounting plate and off-set from and parallel to said shaft,
a spider of molded plastic material having a central boss secured to said mounting plate by said element,
plural integral arms projecting from said boss with two arms generally opposed and a third arm projecting at an angle between said first two arms,
said arms being laterally narrow and relatively flexible and vertically thickened and relatively inflexible under the weight of said motor,
ends on said arms terminating in integral supporting bosses,
and means securing said supporting bosses to said base plate around said opening in said base plate.

6. In a phonograph having a motor with a drive shaft,
a base plate supporting a turntable in embracing relation over said shaft and in frictional driving relation to said turntable,
said motor including a rotor supporting said shaft,
a mounting plate secured to said motor,
a mounting element engaged with said mounting plate near a point along a line through the center of mass of said motor and mounting plate and off-set from and parallel to said shaft,
a spider of elastic material having a central boss secured to said mounting plate by said element,
three integral arms projecting from said boss with two arms generally opposed at a wide obtuse angle and a third arm projecting at an angle within said obtuse angle,
said arms being laterally narrow and relatively flexible and vertically thickened and relatively rigid under the weight of said motor,
said arms terminating in integral supporting bosses,
and means securing said supporting bosses to said base plate.

7. In a phonograph having a motor with a drive shaft,
a base plate supporting a turntable in embracing and frictional driving relation over said shaft,
means supporting said idler roll mounted on said base plate,
said motor including a rotor supporting said shaft,
a mounting plate secured to said motor,
a mounting element engaged with said mounting plate near a point along a line through the center of mass of said motor and mounting plate and parallel to said shaft,
a spider of elastic material having a central boss secured to said mounting plate by said element,
plural arms projecting from said boss with two arms generally opposed,
said arms being laterally narrow and relatively flexible and vertically thickened and relatively rigid under the weight of said motor,
said arms terminating in supporting bosses,
and means securing said supporting bosses to said base plate.

8. A mounting for the motor of a phonograph having a base plate with a turntable having a depending rim rotatably mounted thereon comprising,
a spider of molded plastic material having plural integral arms radiating in angularly spaced relation from a central boss,
said arms being relatively laterally narrow and elastic and relatively vertically thick and rigid,
inclined ends on said arms terminating in integral connection bosses,
means connecting said central boss to said motor at a point along a line through the null point of torsional vibration of the motor and off-set from and parallel to the shaft of the motor,
and means connecting said connection bosses on said arms to said base plate with the shaft of the motor located in frictional driving relation to said turntable within the rim of said turntable.

9. A mounting for the motor of a phonograph having a base plate with a turntable having a rim rotatably mounted on the base plate comprising,
a spider of elastic material having plural integral arms radiating in angularly spaced relation from a central boss,
said arms being relatively laterally narrow and elastic and relatively vertically thick and rigid,
said arms terminating in integral connection bosses,
means connecting said central boss to said motor at a point along a line through the null point of torsional vibration of the motor and off-set from and parallel to the shaft of the motor,
and means connecting said connection bosses on said arms to said base plate with the shaft of the motor located in frictional driving relation to the rim of said turntable.

10. In a phonograph,
a base plate having a turntable with a downturned rim rotatably mounted thereon,
a motor having a shaft arranged parallel to the axis of said turntable,
a vertically rigid support connected to said base plate around said motor and connected to said motor at a single point adjacent a line through the center of mass and null point of angular oscillation of said motor and parallel to the shaft of the motor,
said support being yieldable angularly about said single point,
and means supported on said base plate and frictionally drivingly engaged between said shaft and the interior of said rim.

11. In a phonograph,
a base plate having a turntable with a downturned rim rotatably mounted thereon,
a motor having a shaft arranged parallel to the axis of said turntable,
a vertically rigid support connected to said base plate around said motor and connected to said motor at a single point adjacent a line through the null point of angular oscillation of said motor and parallel to the shaft of the motor,
said support being yieldable angularly about said single point,
and means supported on said base plate and frictionally drivingly engaged between said shaft and said rim.

References Cited by the Examiner

UNITED STATES PATENTS

| | | | |
|---|---|---|---|
| 2,689,464 | 9/54 | Wurtz | 248—18 X |
| 2,881,995 | 4/59 | Neher | 248—15 |
| 2,906,537 | 9/59 | Dale | 274—10 |
| 3,082,635 | 3/63 | Grado | 274—39 |

OTHER REFERENCES

Thomson: W. 7. Mechanical Vibrations. Prentice Hall, N.Y., 1948, pages 72–80.

NORTON ANSHER, *Primary Examiner.*